United States Patent [19]

Nomura et al.

[11] 4,198,149
[45] Apr. 15, 1980

[54] LOCKING SHUTTER SPEED DIAL DEVICE FOR A CAMERA

[75] Inventors: Katsuhiko Nomura, Kawagoe; Keisuke Haraguchi, Ranzan, both of Japan

[73] Assignee: Asahi Kogaku Kogyo Kabushiki Kaisha, Tokyo, Japan

[21] Appl. No.: 831,208

[22] Filed: Sep. 7, 1977

[30] Foreign Application Priority Data

Sep. 8, 1976 [JP] Japan ............................ 51-120710[U]

[51] Int. Cl.² ........................................... G03B 17/38
[52] U.S. Cl. ..................................... 354/268; 354/289
[58] Field of Search ............................... 354/268, 289

[56] References Cited

U.S. PATENT DOCUMENTS

| 3,693,524 | 9/1972 | Furuta | 354/268 |
| 3,918,069 | 11/1975 | Urano | 354/268 |
| 4,038,672 | 7/1977 | Kondo et al. | 354/268 |

FOREIGN PATENT DOCUMENTS 825948 12/1951 Fed. Rep. of Germany .......... 354/289

Primary Examiner—Russell E. Adams
Attorney, Agent, or Firm—Sughrue, Rothwell, Mion, Zinn and Macpeak

[57] ABSTRACT

A camera is provided with a locking shutter speed dial device wherein the shutter release member is mounted coaxially with the shutter speed dial. A spring biased lock lever is positioned to engage a peripheral groove in the shutter release member. Engagement of the lock lever with the groove is accomplished by a pin mounted on the bottom of the shutter speed dial. When the shutter speed dial is rotated to the lock position, the pin urges the lock lever against the spring bias into engagement with the groove thereby preventing inadvertent operation of the shutter release.

4 Claims, 1 Drawing Figure

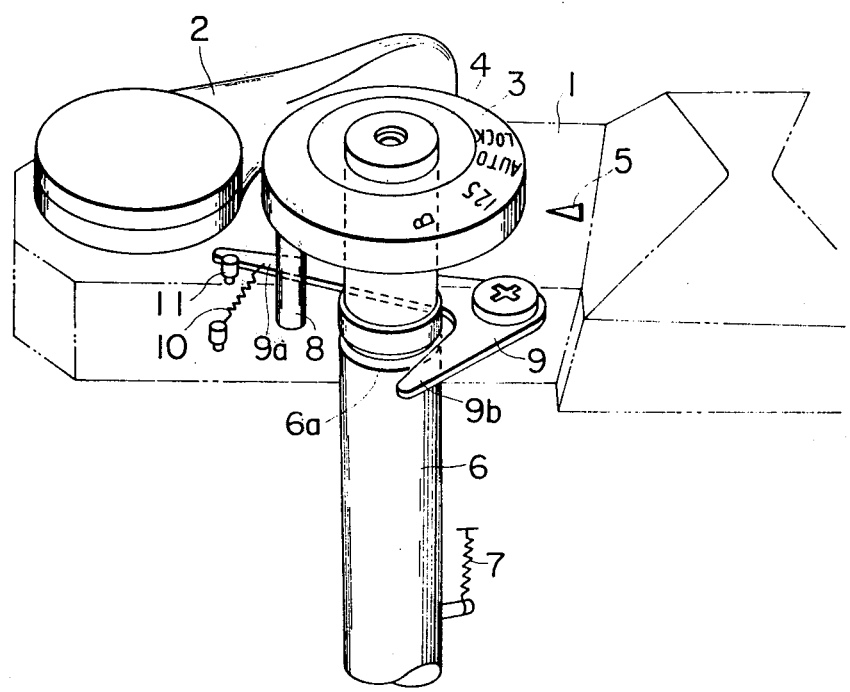

LOCKING SHUTTER SPEED DIAL DEVICE FOR A CAMERA

SUMMARY OF THE INVENTION

The present invention relates to a locking shutter speed dial device for preventing inadvertent shutter release in a camera.

With a view to making the size of a camera compact and providing an improved operability, an attempt has been proposed in which the shutter release member is mounted coaxially with the shutter speed dial. The present invention is directed to providing a shutter speed dial device, wherein, in addition to the aforesaid coaxial mounting, a shutter release member is locked by operating the shutter speed dial, so that an inadvertent shutter release is prevented. With the structure of the invention, the camera remains compact in size and an improved operability is provided.

BRIEF DESCRIPTION OF THE DRAWING

The sole FIGURE of the accompanying drawing shows a perspective view of the device embodying the present invention.

DETAILED DESCRIPTION OF THE INVENTION

A preferred embodiment of the present invention will now be described with reference to the accompanying drawing.

Shown at 1 is a top plate of a camera, and at 2 a film winding lever. A shutter release button 4 is mounted coaxially with a shutter speed dial 3 and coupled to a shutter release button interconnecting member 6, so that when the member 6 is depressed against the force of a spring 7, the shutter release is effected. Shutter speed dial 3 is turned so as to set a desired numeral or legend thereon at an indicia 5 provided on top plate 1, whereby a desired shutter speed or function is obtained. A pin 8 is attached to shutter speed dial 3 and extends downwards and is engageable with an arm 9a of a lock lever 9. Lock lever 9 is biased to rotate in the counterclockwise direction under the force of a spring 10 but is shown in the drawing as being stopped by a stopper 11. Another arm 9b of lock lever 9 opposes a peripheral groove 6a provided on shutter release button interconnecting member 6 in a manner to engage the groove when lock lever 9 is rotated clockwise against the biasing force of spring 10.

If shutter speed dial 3 is turned in the clockwise direction, as viewed in the drawing and the legend "LOCK" on the dial is aligned with indicia 5, pin 8 will engage arm 9a of lock lever 9, thereby urging the lock lever 9 in the clockwise direction against the force of the spring 10, whereby arm 9b will engage the peripheral groove 6a on shutter release button interconnecting member 6, thereby preventing depression of shutter release button 4. Thus, an inadvertent shutter release is prevented by operating the shutter speed dial coaxial with the shutter release button. The provision of the present invention neither increases the size of the prior art compact camera nor impairs the improved operability.

What is claimed is:

1. In a camera having a shutter release operating member coaxially mounted with a shutter speed dial, the improvement comprising:

means for locking said shutter release operating member, and a shutter speed dial interconnecting member, said means and said interconnecting member being engageable with each other by rotating said dial to a predetermined position.

2. The improvement as recited in claim 1 wherein said shutter release operating member is provided with a groove and said means comprises a lock lever positioned to engage said groove when engaged by said interconnecting member.

3. The improvement as recited in claim 2 wherein said shutter release operating member is cylindrical and said groove is a peripheral groove.

4. The improvement as recited in claim 2 wherein said lock lever is spring biased out of engagement with said groove and said interconnecting member is a pin mounted on the bottom of said shutter speed dial, said pin urging said lock lever into engagement with said groove when said dial is rotated to said predetermined position.

* * * * *